Nov. 26, 1968  F. P. BUITING ET AL  3,413,442

SELF-REGULATING THERMAL APPARATUS

Filed July 15, 1965  3 Sheets-Sheet 1

Inventors:
Joseph W. Waseleski, Jr.,
Francis P. Buiting,
by John W. Haug Agent.

Nov. 26, 1968     F. P. BUITING ET AL     3,413,442
SELF-REGULATING THERMAL APPARATUS
Filed July 15, 1965     3 Sheets-Sheet 2
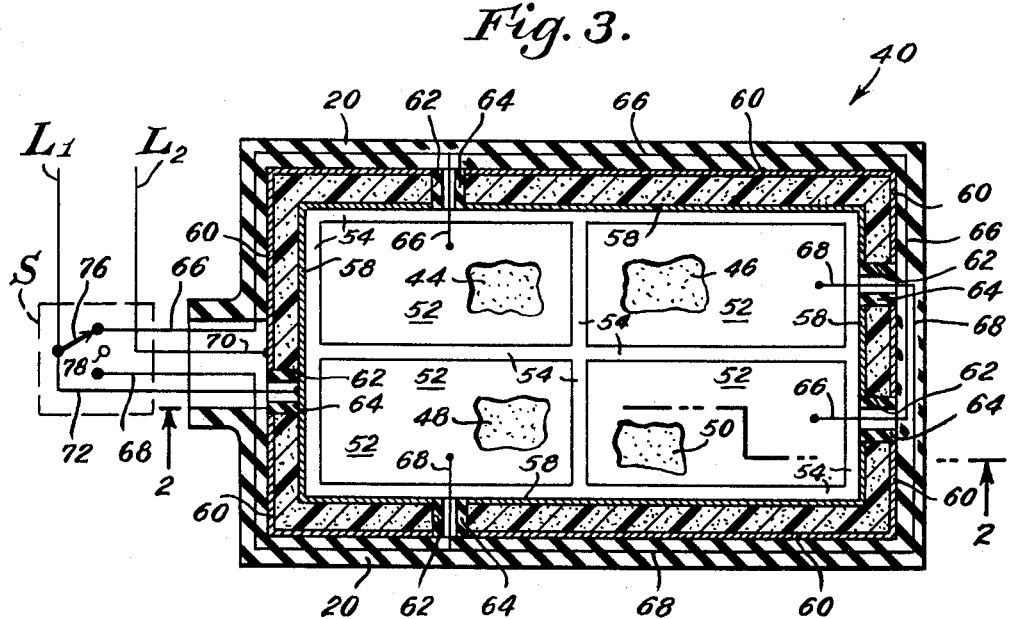
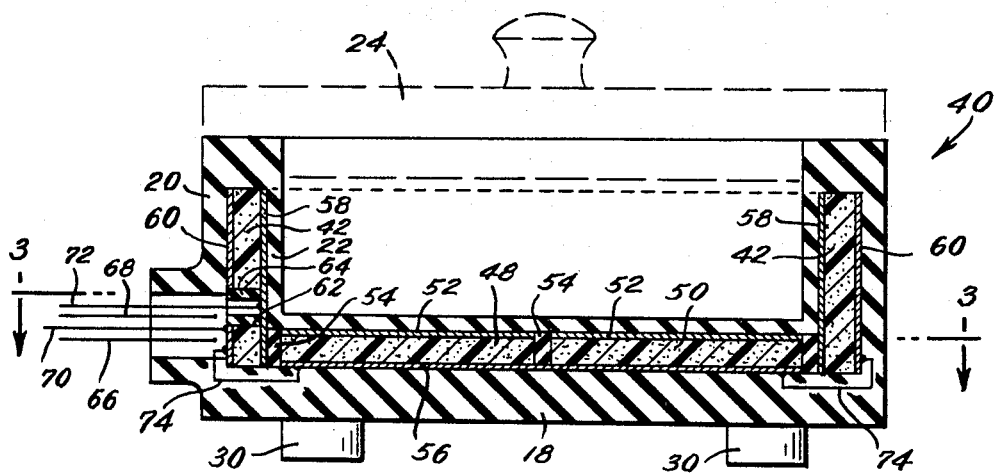

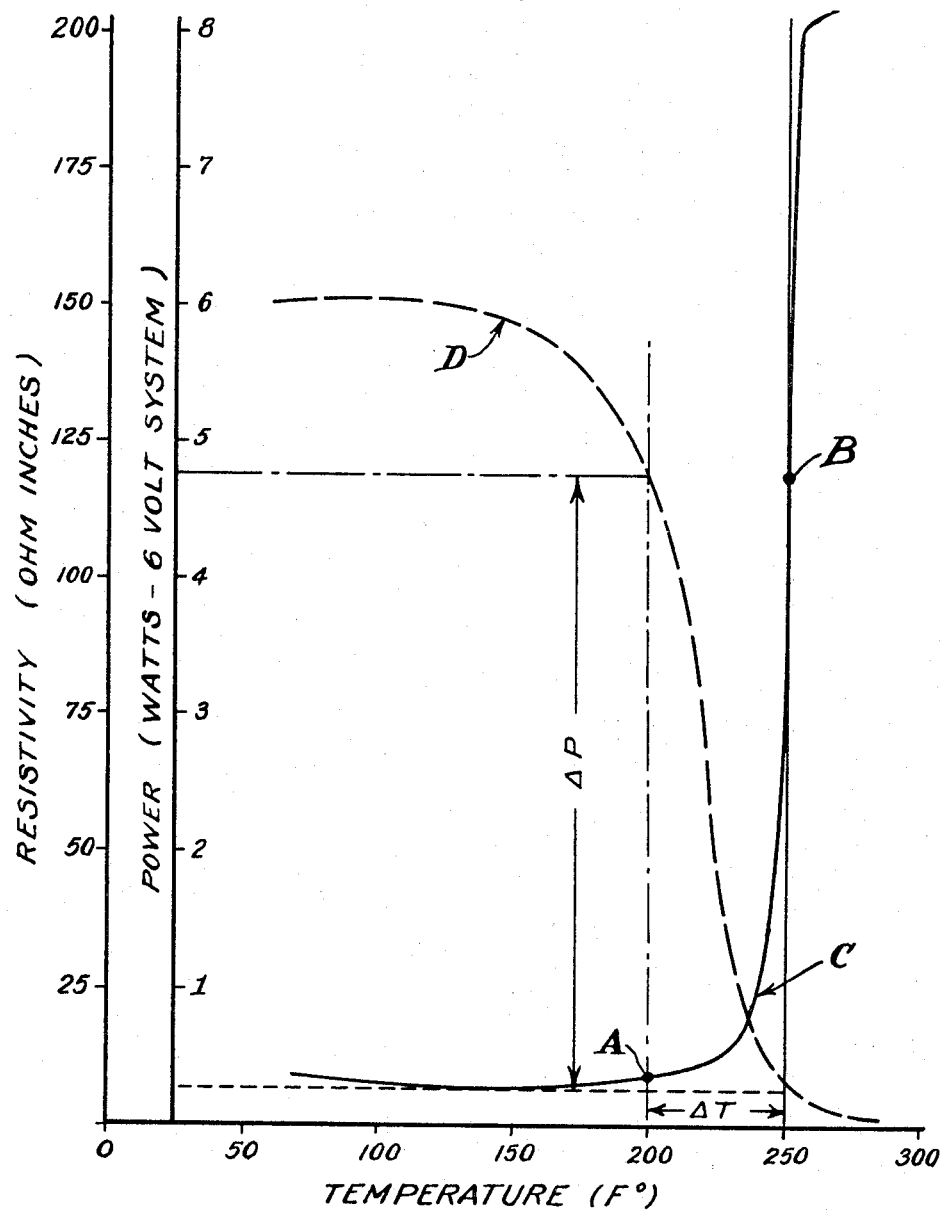

United States Patent Office 3,413,442
Patented Nov. 26, 1968

3,413,442
SELF-REGULATING THERMAL APPARATUS
Francis Peter Buiting, Plainville, and Joseph William Waseleski, Jr., Mansfield, Mass., assignors to Texas Instruments Incorporated, Dallas, Tex., a corporation of Texas
Filed July 15, 1965, Ser. No. 472,108
5 Claims. (Cl. 219—390)

ABSTRACT OF THE DISCLOSURE

Electrical heating devices and methods of making same employing polymeric materials which display a steep-sloped positive temperature-resistivity coefficient (PTC) which serves to self-regulate the amount of heat produced. The materials are ductile and can be molded, extruded, machined and formed in complex shapes including the following embodiments: A utensil formed of a PTC heater element defining a cavity therein; the heating element encapsulated in an electrical insulating jacket preferably formed of material having the same thermal coefficient of expansion and also serving as thermal insulation where desired. Another embodiment employs a plurality of PTC elements having different anomaly temperatures to provide a choice in temperature selection. Yet another embodiment shows either open or close ended passages formed in a PTC heating element.

---

This invention relates to thermal apparatus and methods, and particularly to electrical heating devices and methods for making the same.

Electrical heating devices are many and varied however in the prior art these devices have generally required the use of thermostats along with a heating element to prevent overheating of the heating element, i.e., as a safety means, and also to keep the heating device in the environs of a desired temperature by turning on and off the heating element current by use of movable contacts. This, of course, requires the use of components in addition to the heating element per se which adds significantly to the cost of materials as well as labor in assembling the heating device and further, due to mechanically movable parts, such devices have a limited longevity and are less than perfectly reliable.

On relatively expensive heating devices when precise temperature control is required another approach has been employed using proportional control means whereby relatively complex electrical circuits serve to limit the power input to the heating element to equal the heat loss from the heating device. This is done, for example, by providing a bridge containing a temperature-sensing device which is used to balance a circuit containing the heating element. This type of control eliminates the on/off moving contacts and therefore provides more precise temperature control and more constant power requirements. However the device is relatively complex and expensive.

It has been discovered that by the use of certain materials which display a positive temperature resistivity coefficient, hereinafter referred to as PTC material, a simple, inexpensive heating device can be made which is self-regulating, i.e., the PTC material serves a function analogous to the thermostat by limiting the amount of heat produced. Reference may be had to copending applications of Charles D. Flanagan, Ser. No. 435,165, filed Feb. 25, 1965, and Leo Marcoux, Ser. No. 435,166, filed Feb. 25, 1965, both assigned to the assignee of this application. In these applications the use of a doped barium titanate as a self-regulating heating device is disclosed. While this answers many of the disadvantages of the prior art there are some limitations to the use of ceramic-like material. The preparation of this material is exacting since cracks and occlusions must be avoided which would deleteriously affect the uniformity of the resistivity of the material. Further, these ceramic-like materials are fragile and cannot readily be machined or extruded, etc.

It is an object of this invention to avoid the above-mentioned liabilities of the prior art by the provision of an electrical heating device which is simple, highly reliable and long lasting.

It is an object of the invention to provide heating apparatus which has a self-regulated temperature.

It is another object of the invention to provide a thermal device which is of a self-regulating temperature nature which can be furnished in complex configurations.

It is yet another object of the instant invention to provide a method of heat regulation utilizing a self-regulating electrical heating element.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings:

FIGURE 2 is a vertical cross-section through a second embodiment of the invention;

FIGURE 3 is a cross-section through line 3—3 of FIG. 2;

FIGURE 6 is a chart plotting linearly resistivity and power against temperature of a steep-sloped PTC material usable in accordance with this invention.

Similar reference characters indicate corresponding parts throughout the several views of the drawings.

Figure 1:
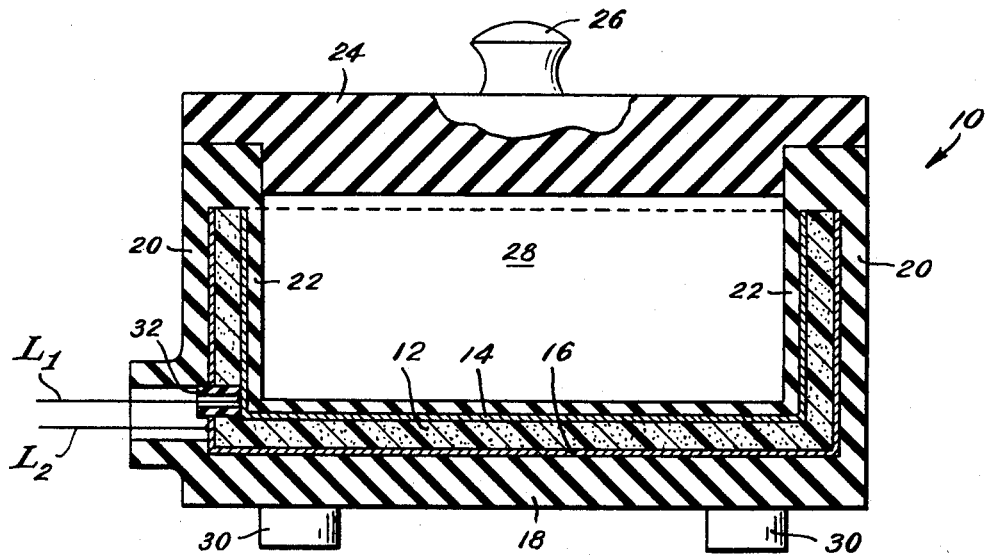
FIGURE 1 is a vertical cross-section through one embodiment of the invention.

Dimensions of certain of the parts as shown in the accompanying drawings may have been modified and/or exaggerated for the purposes of clarity of illustration.

The PTC elements used in accordance with this invention act as a heater and also as their own temperature regulator. The PTC material which is a semoconductive, steep-sloped material has a low resistance in the cold state and initially when power is applied through the heating circuit relatively large currents are drawn and consequently relatively high power and heat are dissipated Many materials have a PTC characteristic, such as barium titanate doped with lanthanum as disclosed in the copending applications referred to supra. However, doped barium titanate is brittle and cannot easily be formed in complex configurations. The instant invention involves the use of a material which is ductile, machineable, moldable, extrudable and can therefore be formed in complex shapes in contradistinction to the ceramic-like materials above-referred-to. FIGURE 6 shows resistivity and power versus temperature curves of a carbon black filled cross-linked polyethylene No. 4510 obtainable from Cabot Corporation, 125 High St., Boston, Mass. A perusal of FIG. 6 will indicate the characteristics of this material which result in its self-regulating and current limiting capability. FIGURE 6 relates to a nonlinear resistance element in a 6 volt circuit. With the material at ambient temperature (for instance approximately 70° F.) and when the circuit is closed it will be noted that resistance is at a relatively low level (curve C) but the power (curve D)

is at a relatively high level due to the low resistance and hence the current value is relatively high ($E=IR$). This power is dissipated as heat ($I^2R$) thereby warming up the material. The resistance stays at a relatively low level as the temperature increases until an anomaly point is reached at which point the resistance rapidly increases with a slight temperature rise. At the anomaly point, an increase $\Delta T$ from point A to point B, or 25% change, results in an increase in resistivity from about 7 ohm-inches to approximately 118 ohm-inches, or an increase of 95%. So it may be seen that at the anomaly point an increase in temperature is accompanied by a proportionally much greater increase in resistivity. Concomitant with this increase in resistivity is a decrease in power showing that current level drops as the resistance increases thereby limiting the quantity of heat generated ($I^2R$). As a result the heat generated always tends to balance the heat dissipated. If the heat demand is increased, the temperature of the PTC material is reduced causing a large drop in resistance. This results in a concomitant increase in current ($E=IR$) and hence increased generated power ($P=I^2R$) until once again the temperature is increased causing the resistance to increase so that the heat generated equals the heat dissipated. In like manner variations in line voltage and/or ambient temperature will effect similar control. In other words a change in power dissipation as shown in curve D in FIG. 6 will cause a proportional increase in temperature with a fixed resistance heater. But when PTC material is used this large variation in power dissipation referred to above takes place over a very narrow temperature range. This shows clearly the degree of control obtained and how it depends on the steepness of the $R=f(T)$ curve.

As explained in more detail infra, the PTC element is encapsulated in an electrical insulating jacket which could advantageously be formed out of material having the same thermal expansion as the PTC element, such as polyethylene with no carbon black contained therein. This jacket would also serve as a thermal insulation on the sides of the element which are not facing the area to be heated by making the jacket substantially thicker on those sides. As the PTC element heats up due to heat generated, the portions or layers nearest the thermal insulation will increase in temperature and will increase abruptly in resistance when the anomaly temperature is reached. Thus the material in the high resistance state, or in other words the anomaly point, will move from the side facing the insulation layer through the element to the side facing the area which is to be heated. Upon an increase in heat demand or load (such as caused by inserting an object to be heated in the thermal device) this anomaly point will move back through the PTC element toward the side facing the insulation until the heat demand decreases permitting an equilibrium to be again achieved. Minor variations in heat demand will merely change the thickness of that portion of the PTC element in the high resistance state. This thickness adjusts itself so that the total PTC element resistance presented to the essentially constant volage external circuit is such that heat generated just offsets heat dissipated to the ambient and/or the object being heated.

Materials other than carbon black filled cross-linked polyethylene which have as a characteristic a large positive temperature coefficient of resistance (PTC), that is material in which the percent change in resistance per degree change in temperature in the so-called break or anomaly point is very large can be used. Other polymers which can be cross-linked with carbon or other elements may exhibit a PTC characteristic large enough to be useful in this invention.

The particular quantity of electrical resistivity and the anomaly temperature can be changed, for instance, by the amount of carbon black loading and the amount of cross-linking.

Referring now to the drawings FIG. 1 depicts the first of several of the possible embodiments of our invention. Numeral 10 represents a utensil comprising a self-controlled heater. By way of example but not of limitation, the utensil 10 could be used as a butter dish so as to maintain butter at a predetermined temperature either directly in the utensil or in a separate container placed within utensil 10. Utensil 10 is formed out of PTC material such as carbon black filled cross-linked polyethylene.

Utensil 10 has a PTC heater element 12 of PTC material having electrical conductive layers 14 and 16, such as silver, attached to two opposite sides of said element by any conventional means such as by vacuum deposition. Element 12 is encased in electrical and thermal insulation jacket 18 formed of polyethylene for example. It will be noted that outer portion 20 of jacket 18 is of a greater thickness than inner portion 22 so that heat loss to the ambient is minimized but heat flow to the opposite side of the PTC element is optimized. A cover 24 with handle portion 26 may conveniently be supplied to complete an enclosure 28. The device may be mounted on legs 30. $L_1$ is connected to inner conductive layer 14, $L_2$ is connected to outer conductive layers 16. An insulation sleeve 32 isolates layer 14 from layer 16 to prevent a short circuit by $L_1$.

FIGS. 2 and 3 show utensil 40 having a plurality of PTC elements 42, 44, 46, 48 and 50. Elements 42–50 have different anomaly temperatures (for instance, by varying the carbon black loading and amount of cross-linking) in order to provide a choice in temperature selection. For instance elements 44 and 50 may have an anomaly temperature of 100° C., elements 46 and 48 may have an anomaly temperature of 120° C. while wall portion element 42 may have an anomaly temperature of 110° C. Elements 42–50 are electrically isolated by insulation layers 54 and jacket 18 which is shown, as in the FIG. 1 embodiment with a relatively thick insulation layer 20 on the outside, and a relatively thin insulation layer 22 on the inside to prevent heat loss to the ambient on the one hand and to optimize heat flow to the inside on the other hand. PTC elements 44–50 are coated by conventional means with a conductive layer 52, e.g., silver on the upper surfaces thereof in any convenient manner and a conductive layer 56, e.g., silver, on the bottom surfaces thereof. Wall portion element 42 is coated with an inside conductive layer 58 and an outside conductive layer 60 in the same manner. Apertures 62 and insulation sleeves 64 are provided in element 42 to facilitate the provision of electrical leads for the elements 42–50. $L_2$ is connected through switch S to conductor 70 which is connected to layer 60. Layer 60 and layer 56 are connected by electrical connectors 74 so that layers 60 and 56 are at the same electrical potential. Line $L_1$ is connected through switch S to conductive layer 58 by conductor 72. Conductor 66 is electrically connected to layer 52 of elements 44 and 50. Conductor 68 is electrically connected to layer 52 of elements 48, 46. Movable contact arm 76 of switch S is movable to electrically connect $L_1$ to either conductor 66 or 68 thereby energizing either PTC elements 44, 50 or 46, 48 respectively as well as element 42. Arm 76 may be switched to an off position 78 whereby only the wall PTC element 42 is energized.

Figure 4:
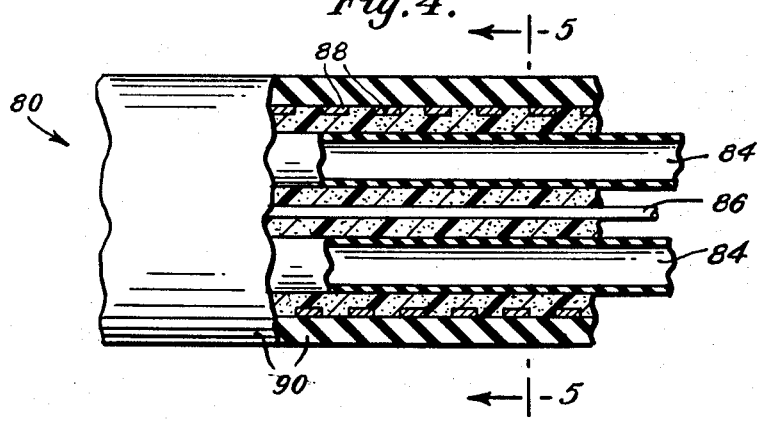
FIGURE 4 is a partial cross-section through a third embodiment of the invention.
Figure 5:
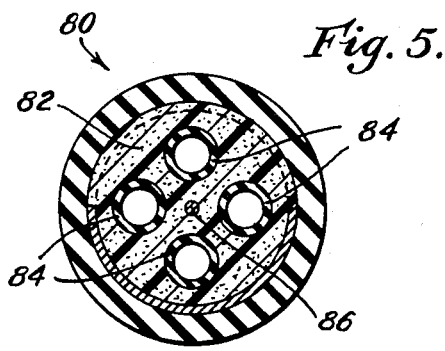
FIGURE 5 is a cross-section through line 5—5 of FIG. 4.

FIGS. 4 and 5 illustrate a third embodiment generally referred to by numeral 80 which comprises PTC element 82 in which is located tubular members 84 of electrical insulating material such as polyethylene, and conductor 86 of copper or other good electrical conductive material. Conductor 88 of any convenient cross-section and good electrical conductive material is spiralled around element 82 which is then surrounded with electrical and heat insulation 90. Conductor 88 could also take the form of a conductive coating placed about the periphery of element 82 or any other conventional contact means.

Utensil 80 may have tubes 84 open at both ends to facilitate passage of a fluid medium therethrough which will be heated by the PTC heating element. This would be useful for such appliances as hair driers or heat guns. On the other hand tubes 84 may be sealed with insulating material on one end and have a removable insulating cover for the other end so that various ingredients can be heated up in the separate tubes.

A voltage is impressed between conductors 86 and 88. This causes current to flow through PTC element 82, causing it to heat up as explained supra.

Instead of placing the electrical conductors 86, 88 generally parallel to the longitudinal axis of the cylindrical PTC element 82, the conductors may take the form of clamps placed at the ends of a fine length of element 82 or that current flow is parallel to the longitudinal axis of element 82 rather than perpendicular.

It will be noted that the PTC material used in this invention can be molded, extruded, machined, etc., into any desired shape to give a heating device which is simple, rugged, reliable, inexpensive yet self-regulating.

In view of the above, it will be seen that the several objects of the invention are achieved, and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention. Also, it is to be understood that the phraseology or terminology employed herein is for purposes of description and not of limitation.

We claim:
1. An electrical heating device comprising:
    (a) an open ended container having opposite inner and outer sides, the inner side defining a cavity therein and formed of a ductile semiconductive steep-sloped PTC material;
    (b) conductive layers attached to two spaced portions of said PTC material;
    (c) an electrical lead attached to each conductive layer; and
    (d) electrical insulation means encapsulating said PTC material, said encapsulating means of a greater thickness on one of said opposite sides thereby serving as thermal insulation.
2. A device according to claim 1 in which the PTC material is used as a direct heat exchanger.
3. An electrical heating device comprising:
    (a) an open ended container defining a cavity therein formed of a ductile, semiconductive steep-sloped PTC material;
    (b) conductive layers attached to two spaced portions of said PTC material;
    (c) an electrical lead attached to each conductive layer; and
    (d) electrical insulation means, having approximately the same thermal expansion coefficient as said PTC material, encapsulating said PTC material.
4. A device according to claim 3 in which the PTC material is used as a direct heat exchanger.
5. An electrical heating device comprising:
    (a) an open ended container defining a cavity therein formed of a ductile, semiconductive steep-sloped PTC material comprising carbon black filled, cross-linked polyethylene;
    (b) conductive layers attached to two spaced portions of said PTC material;
    (c) an electrical lead attached to each conductive layer; and
    (d) electrical insulation means comprising polyethylene encapsulating said PTC material.

References Cited
UNITED STATES PATENTS

| | | |
|---|---|---|
| 1,447,031 | 2/1923 | Newell. |
| 2,274,839 | 3/1942 | Marick _____ 219—301 |
| 2,386,903 | 10/1945 | Lutomirski _____ 219—505 |
| 2,489,753 | 11/1949 | Cox _____ 13—22 |
| 2,933,586 | 4/1960 | Schusterius _____ 219—538 |
| 3,243,753 | 3/1966 | Kohler _____ 338—31 |

RICHARD M. WOOD, *Primary Examiner.*

C. L. ALBRITTON, *Assistant Examiner.*